(12) United States Patent
Lever

(10) Patent No.: US 8,532,604 B2
(45) Date of Patent: Sep. 10, 2013

(54) WATERPROOF RADIO

(75) Inventor: Michael Lever, Vancouver (CA)

(73) Assignee: Nautilus Lifeline Ltd., Richmond, British Columbia (CA)

( * ) Notice: Subject to any disclaimer, the term of this patent is extended or adjusted under 35 U.S.C. 154(b) by 0 days.

(21) Appl. No.: 13/448,728

(22) Filed: Apr. 17, 2012

(65) Prior Publication Data

US 2012/0276940 A1 Nov. 1, 2012

Related U.S. Application Data

(60) Provisional application No. 61/479,454, filed on Apr. 27, 2011.

(51) Int. Cl.
*H04B 1/38* (2006.01)

(52) U.S. Cl.
USPC ........................................ 455/347; 455/575.8

(58) Field of Classification Search
USPC ....................... 455/90.3, 347, 575.8
See application file for complete search history.

(56) References Cited

U.S. PATENT DOCUMENTS

| | | | |
|---|---|---|---|
| 4,823,397 A * | 4/1989 | Hewitt | 455/90.3 |
| 6,844,845 B1 * | 1/2005 | Whiteside et al. | 342/357.64 |
| 6,980,788 B2 * | 12/2005 | Peeples | 455/347 |
| 2008/0081679 A1 * | 4/2008 | Kawasaki et al. | 455/575.8 |
| 2008/0174478 A1 * | 7/2008 | Whiteside et al. | 342/357.1 |
| 2009/0017884 A1 * | 1/2009 | Rotschild | 455/575.8 |
| 2009/0191927 A1 * | 7/2009 | Hong | 455/575.8 |
| 2011/0045882 A1 * | 2/2011 | Yamaguchi et al. | 455/575.8 |
| 2011/0312394 A1 * | 12/2011 | Jeon | 455/575.8 |

* cited by examiner

Primary Examiner — Creighton Smith
(74) Attorney, Agent, or Firm — McCarthy Tétrault LLP

(57) ABSTRACT

A radio, comprising: an enclosure having a top lid, a bottom lid, and a body, the top lid and the bottom lid being removable from the body; a radio system mounted in the body, the body having a top cover and a bottom cover for the radio system; a first seal formed or provided between the top lid and the body to waterproof the radio system when the top lid is installed over the top cover; a second seal formed or provided between the bottom lid and the body to waterproof the radio system when the bottom lid is installed over the bottom cover; and, at least one cord for coupling the top lid and the bottom lid to the body.

15 Claims, 19 Drawing Sheets

WATERPROOF RADIO

This application claims priority from U.S. Provisional Patent Application No. 61/479,454, filed Apr. 27, 2011, and incorporated herein by reference.

FIELD OF THE INVENTION

This invention relates to the field of mobile radios, and more specifically, to waterproof mobile radios for outdoor and aquatic use.

BACKGROUND

Current radios and wireless mobile communication devices for outdoor and aquatic use may include microprocessors, memory, speakers, headphones, and may run one or more software applications in addition to providing for voice communications. Such radios may be used by skiers, mountain climbers, hikers, bikers, sailors, fishers, hunters, swimmers, scuba divers, kayakers, boaters, firefighters, police, military, coast guard, merchant mariners, etc.

For example, a scuba diver may use a radio while on the surface of the water to contact his or her dive boat. The effective use and operation of such radios is essential for maintaining diver safety in emergency situations. In particular, in emergency situations where the dive boat is not available to retrieve a diver or has left the dive area, it is essential for maintaining diver safety that effective distress communications are available to the diver in order to contact the dive boat so that the diver may be retrieved. In most instances a wayward dive boat may be recalled via surface communication to the dive area to retrieve the abandoned diver. A diver who is left behind at the dive area will realize his or her problem while on the surface of the water and will need to communicate with boats or others who are at or above the surface of the water to affect his or her rescue. Divers being left behind by dive boats is a big problem. In fact, an estimated 30 to 45 divers get left behind by dive boats or are otherwise lost at sea and consequently die every year. Similarly, a commercial fisher working at sea may be swept over the side of his or her fishing boat during a winter storm. Such a situation may prove fatal unless the fisher can contact the fishing boat to be retrieved.

Existing radios and wireless devices for such users are problematic. Some existing devices include Global Positioning System ("GPS") based locating equipment. However, these devices are typically quite expensive and are cumbersome for to use in an emergency situation. Other radios are not sufficiently waterproofed to provide adequate protection from the elements.

A need therefore exists for an improved waterproof radio. Accordingly, a solution that addresses, at least in part, the above and other shortcomings is desired.

SUMMARY OF THE INVENTION

According to one aspect of the invention, there is provided a radio, comprising: an enclosure having a top lid, a bottom lid, and a body, the top lid and the bottom lid being removable from the body; a radio system mounted in the body, the body having a top cover and a bottom cover for the radio system; a first seal formed or provided between the top lid and the body to waterproof the radio system when the top lid is installed over the top cover; a second seal formed or provided between the bottom lid and the body to waterproof the radio system when the bottom lid is installed over the bottom cover; and, at least one cord for coupling the top lid and the bottom lid to the body.

BRIEF DESCRIPTION OF THE DRAWINGS

Features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the invention. In some instances, certain software, circuits, structures and techniques have not been described or shown in detail in order not to obscure the invention.

According to one embodiment, the invention provides a waterproof radio for operation on multiple frequencies (e.g., VHF (very high frequency), marine band VHF, wireless network frequencies, cellular telephone frequencies, etc.). The housing of the radio is waterproof when its top and bottom lids (or caps) are closed. The rescue radio may be used to help prevent users from getting lost or left behind while outdoors or at sea. It is a wireless mobile communication device and may also be used for both outdoor and indoor use. The radio incorporates removable lids (or caps) that protect the speaker, microphone, and push-to-talk buttons from the elements. Opening the top lid (or cap) may allow the radio's antenna to be extended. The radio may be equipped with a GPS display, an imbedded dive computer, a tone generator to transmit GPS information, an emergency distress or call button, etc.

Figure 1:
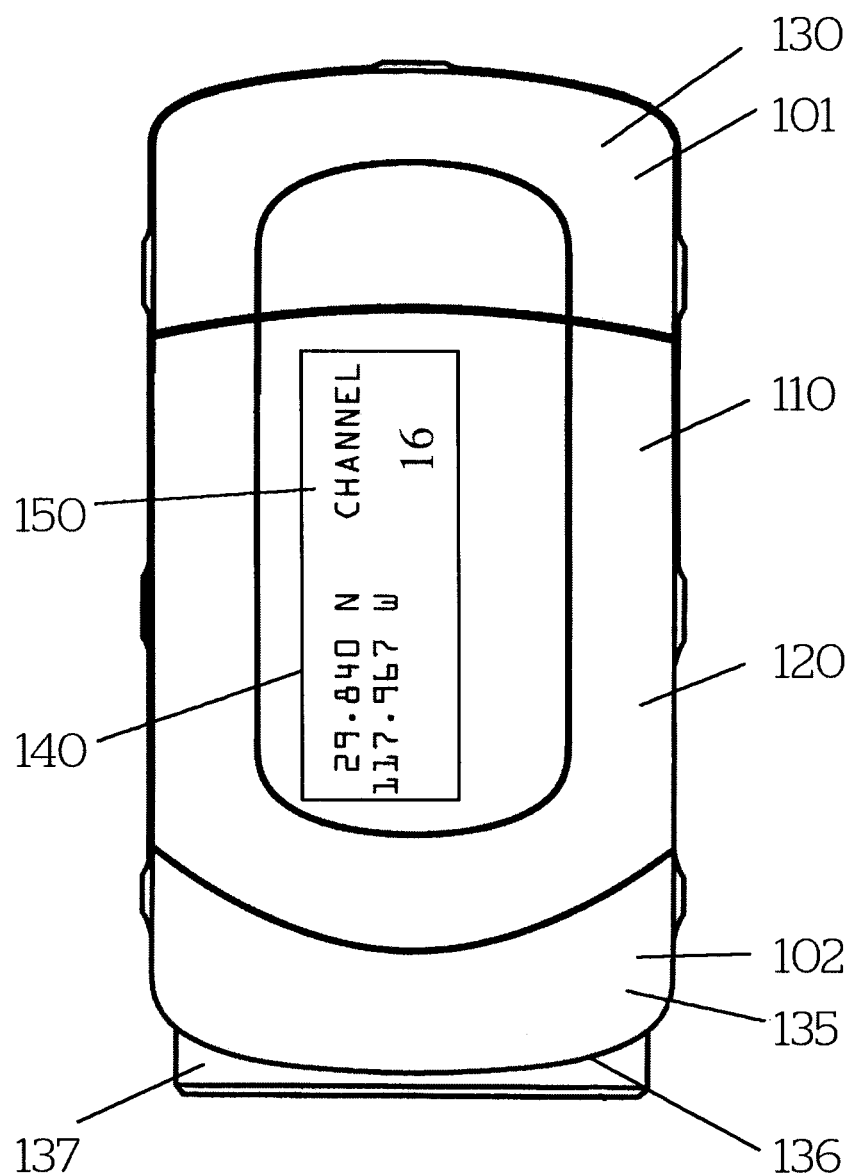
FIG. 1 is a front view illustrating a radio with its top and bottom lids closed in accordance with an embodiment of the invention.
Figure 2:
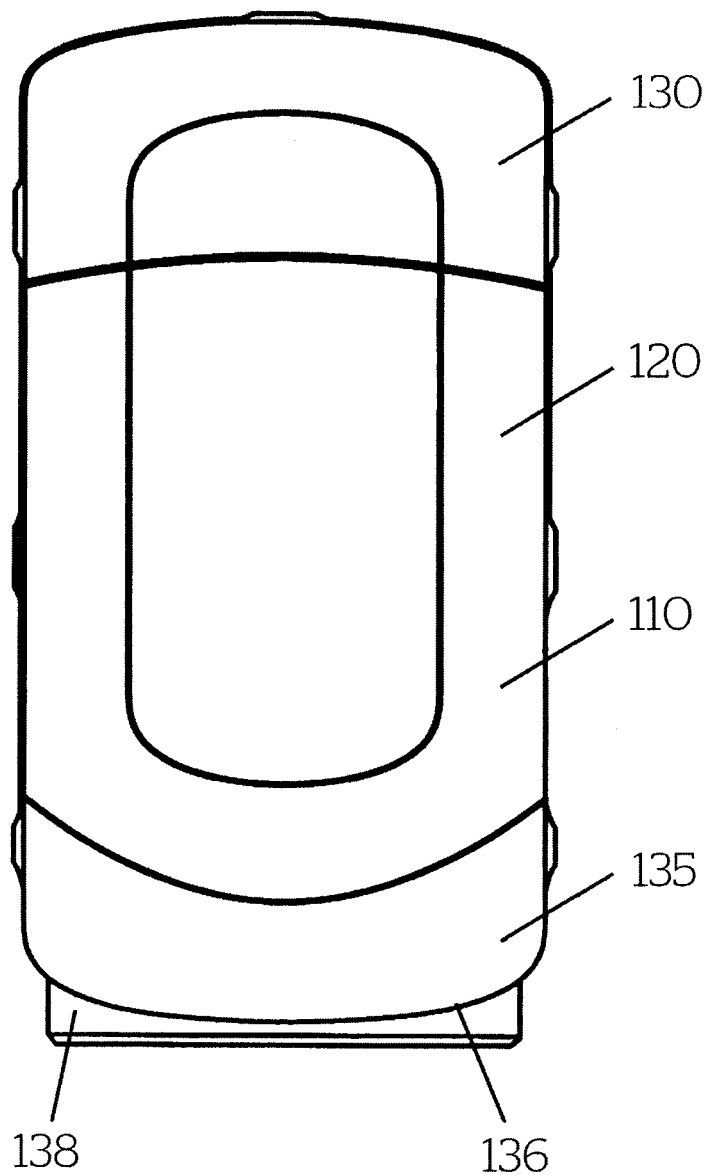
FIG. 2 is a rear view illustrating the radio of FIG. 1 with its top and bottom lids closed in accordance with an embodiment of the invention.
Figure 3:
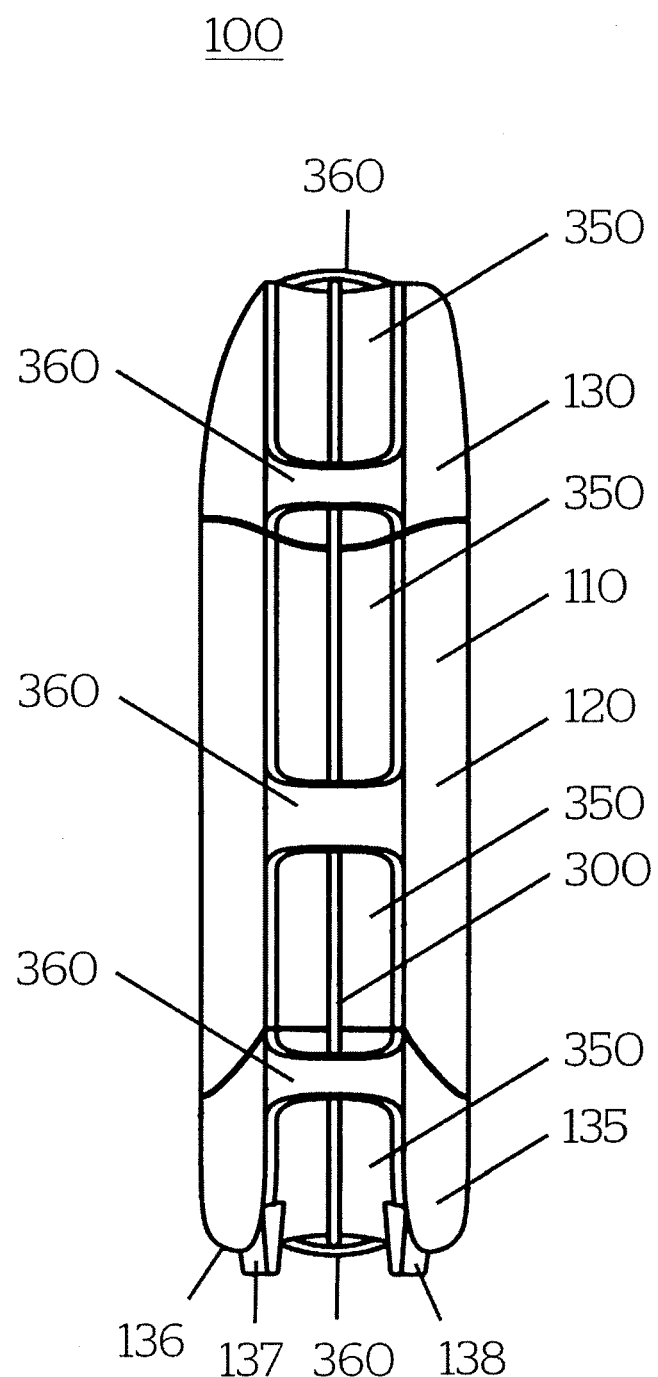
FIG. 3 is a right side view illustrating the radio of FIG. 1 with its top and bottom lids closed in accordance with an embodiment of the invention.
Figure 4:
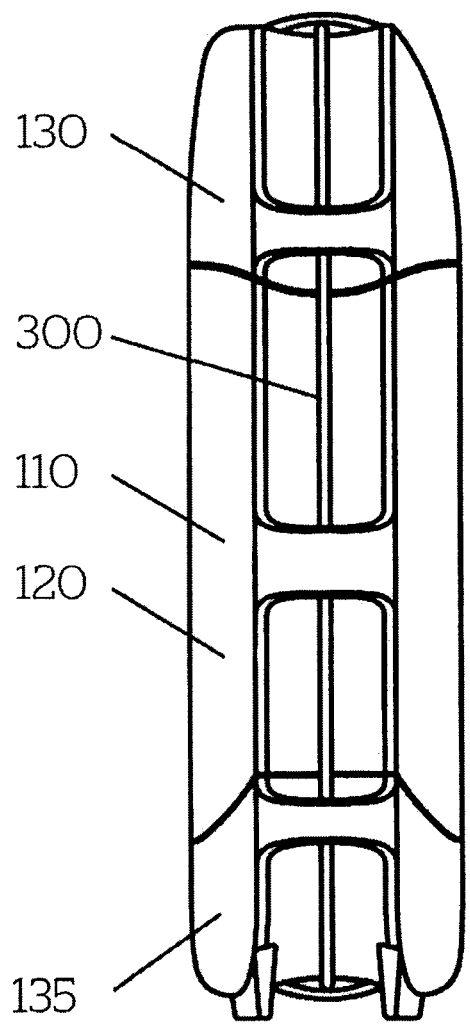
FIG. 4 is a left side view illustrating the radio of FIG. 1 with its top and bottom lids closed in accordance with an embodiment of the invention.
Figure 5:
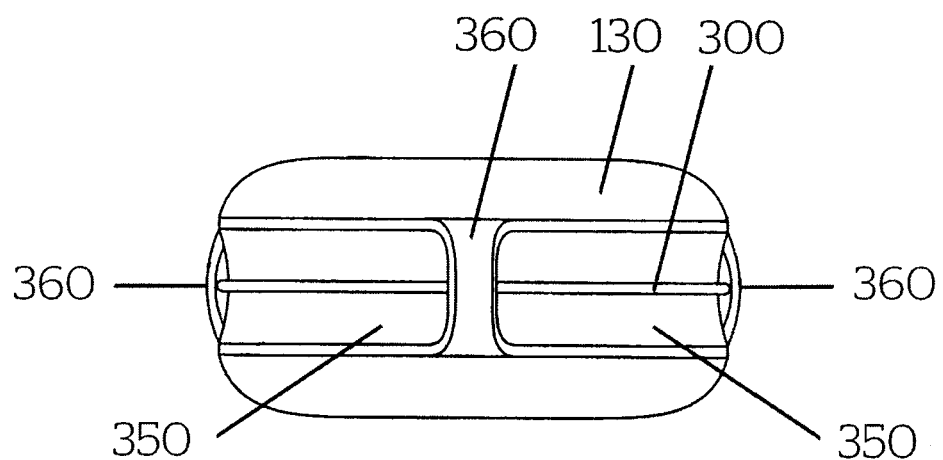
FIG. 5 is a top view illustrating the radio of FIG. 1 with its top and bottom lids closed in accordance with an embodiment of the invention.
Figure 6:
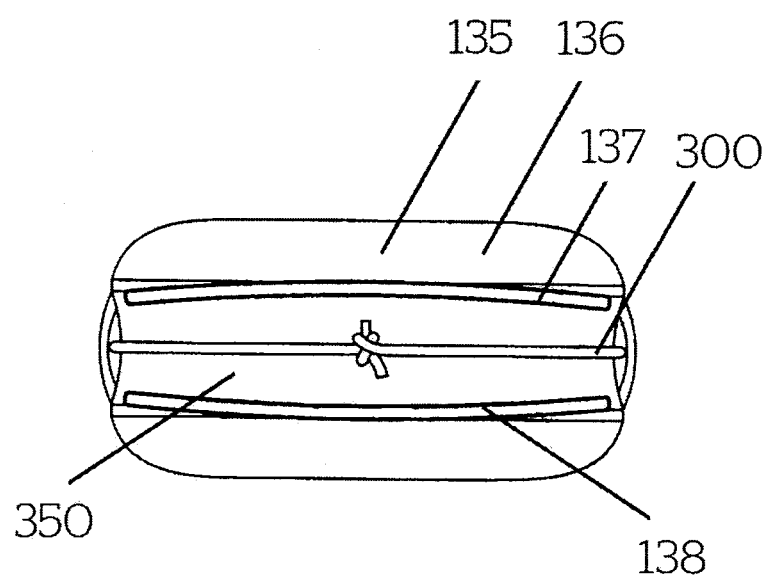
FIG. 6 is a bottom view illustrating the radio of FIG. 1 with its top and bottom lids closed in accordance with an embodiment of the invention.
Figure 7:
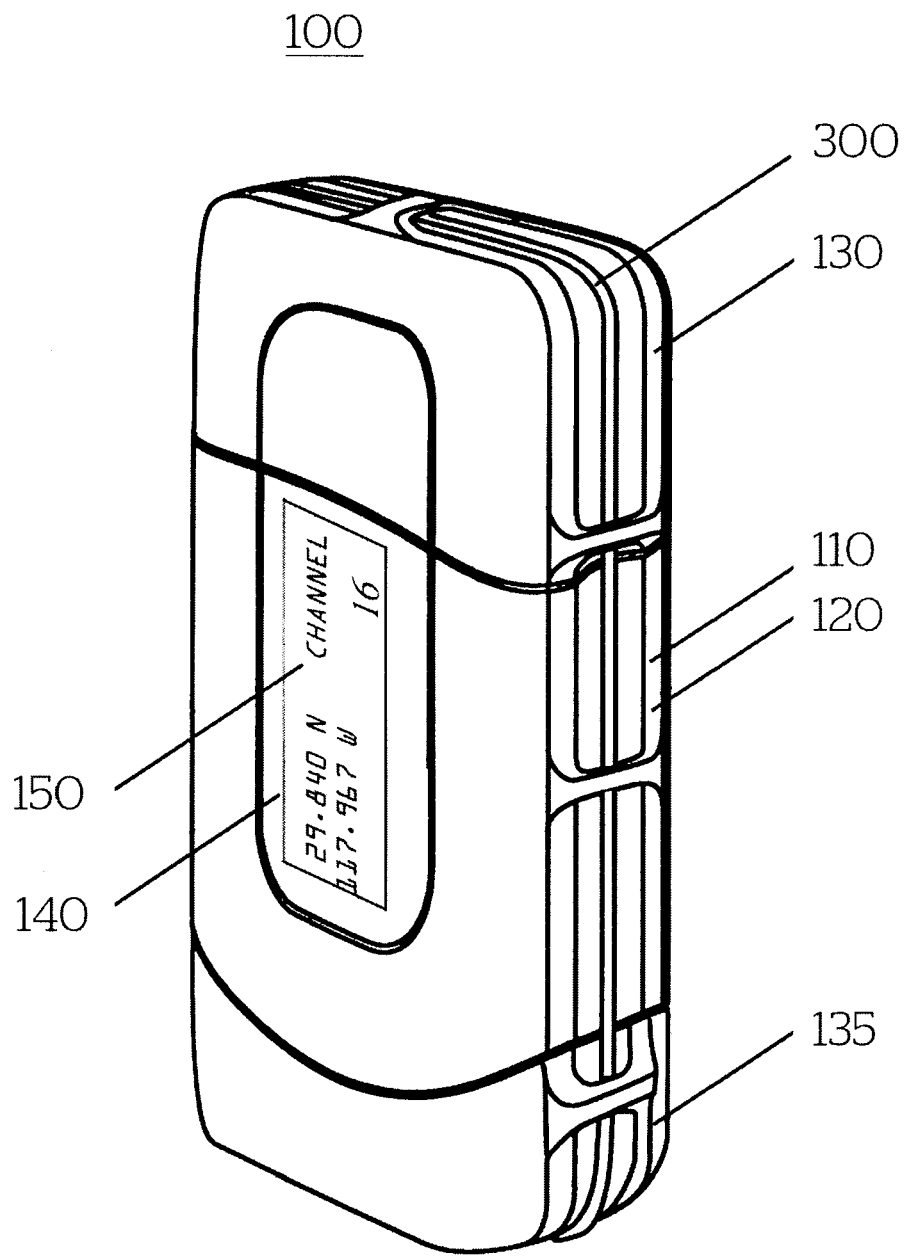
FIG. 7 is a front perspective view illustrating the radio of FIG. 1 with its top and bottom lids closed in accordance with an embodiment of the invention.

FIG. 1 is a front view illustrating a radio 100 with its top and bottom lids 130, 135 closed in accordance with an embodiment of the invention. FIG. 2 is a rear view illustrating the radio 100 of FIG. 1 with its top and bottom lids 130, 135 closed in accordance with an embodiment of the invention. FIG. 3 is a right side view illustrating the radio 100 of FIG. 1 with its top and bottom lids 130, 135 closed in accordance with an embodiment of the invention. FIG. 4 is a left side view illustrating the radio 100 of FIG. 1 with its top and bottom lids 130, 135 closed in accordance with an embodiment of the invention. FIG. 5 is a top view illustrating the radio 100 of FIG. 1 with its top and bottom lids 130, 135 closed in accordance with an embodiment of the invention. FIG. 6 is a bottom view illustrating the radio 100 of FIG. 1 with its top and bottom lids 130, 135 closed in accordance with an embodiment of the invention. And, FIG. 7 is a front perspective view illustrating the radio 100 of FIG. 1 with its top and bottom lids 130, 135 closed in accordance with an embodiment of the invention.

Figure 8:
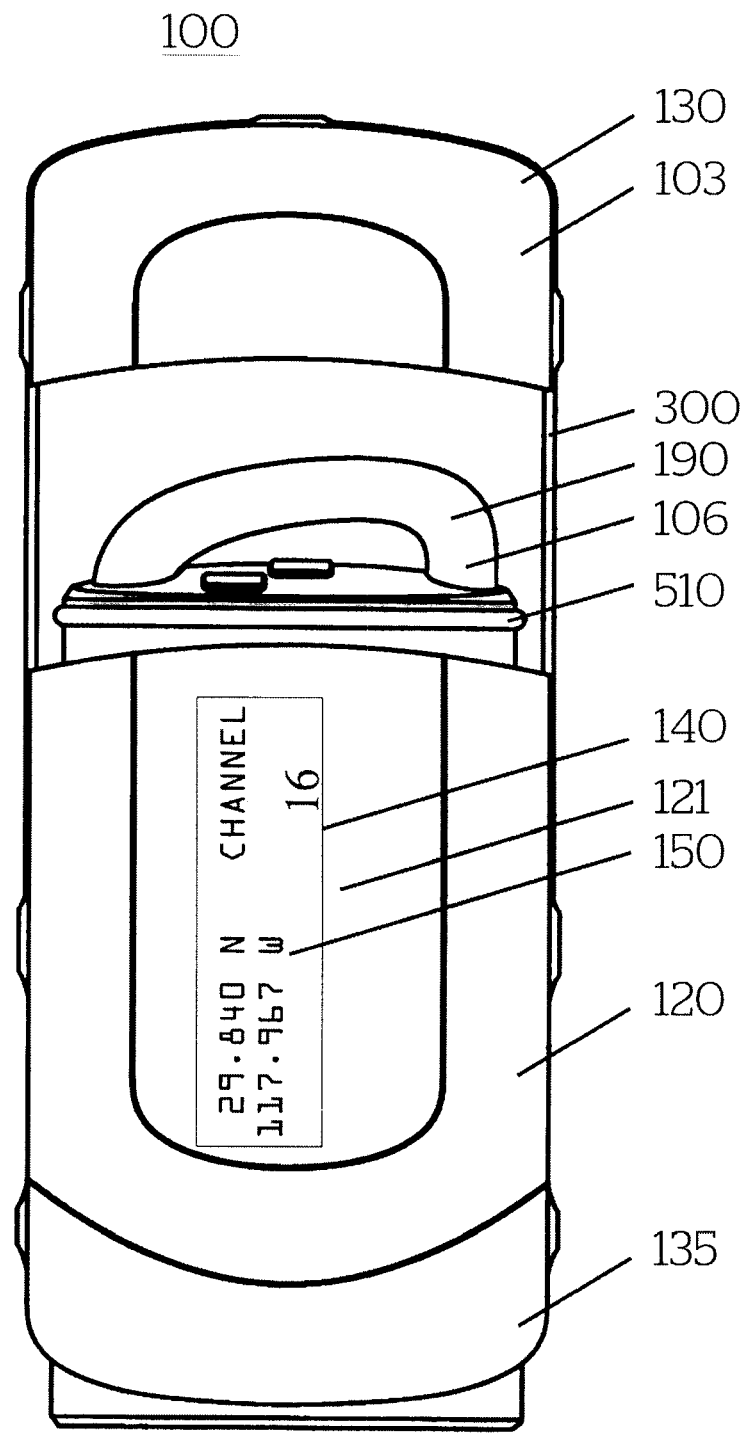
FIG. 8 is a front view illustrating the radio of FIG. 1 with its top lid opened and with its antenna folded in accordance with an embodiment of the invention.
Figure 9:
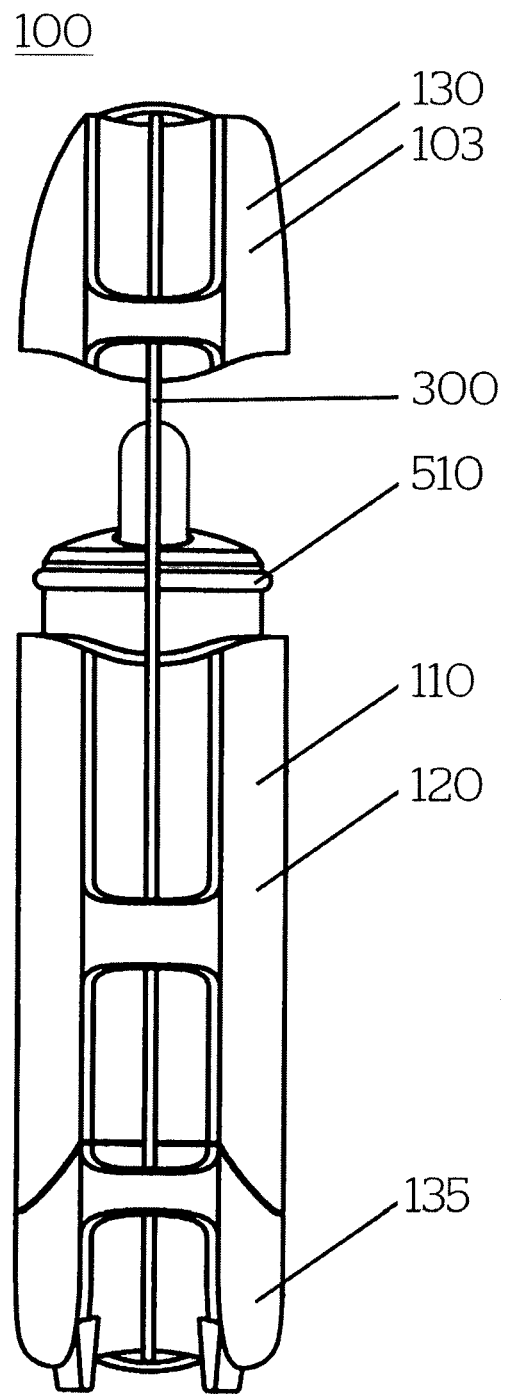
FIG. 9 is a right side view illustrating the radio of FIG. 1 with its top lid opened in accordance with an embodiment of the invention.
Figure 10:
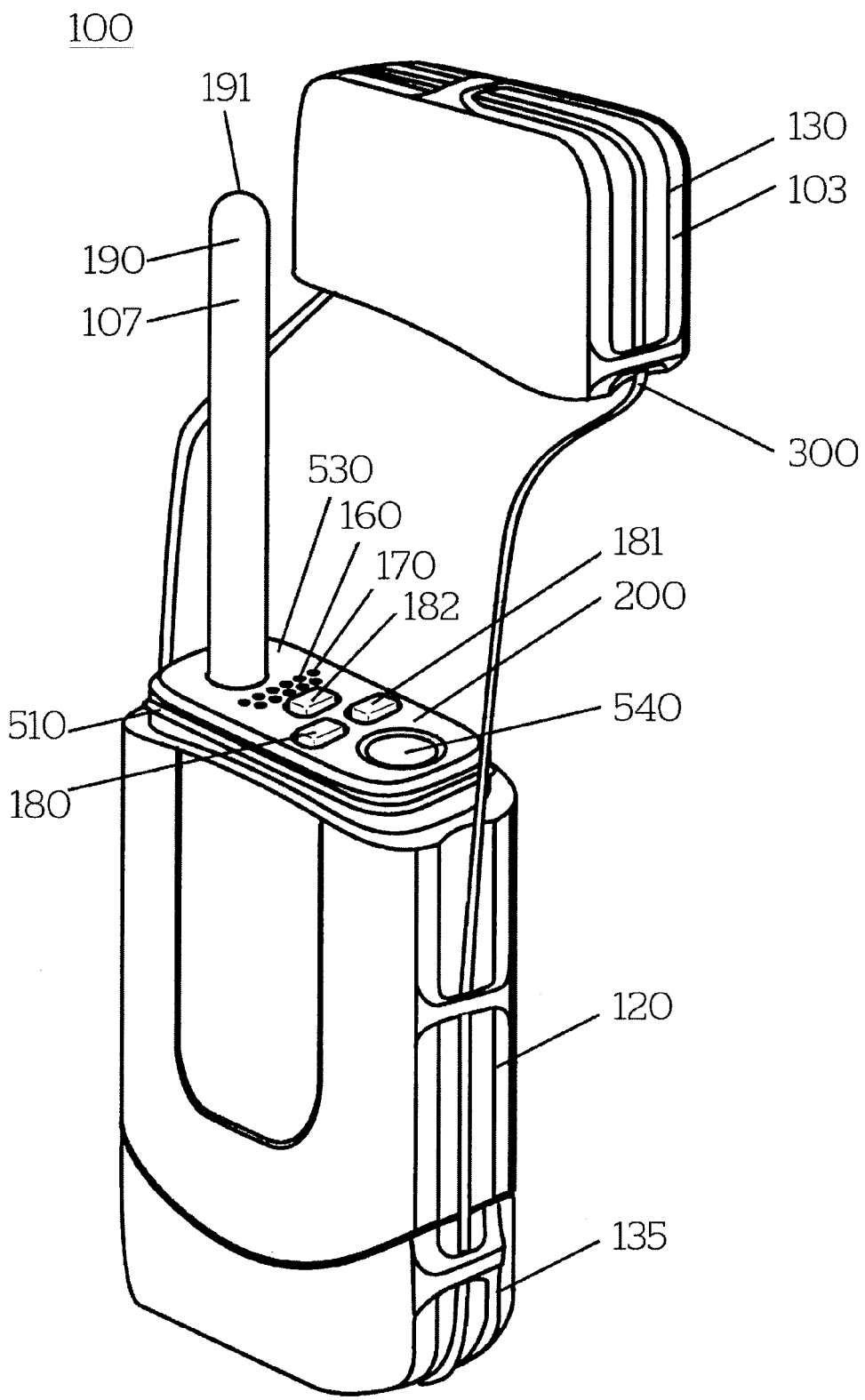
FIG. 10 is a rear perspective view illustrating the radio of FIG. 1 with its top lid opened and moved to one side and with its antenna extended in accordance with an embodiment of the invention.
Figure 11:
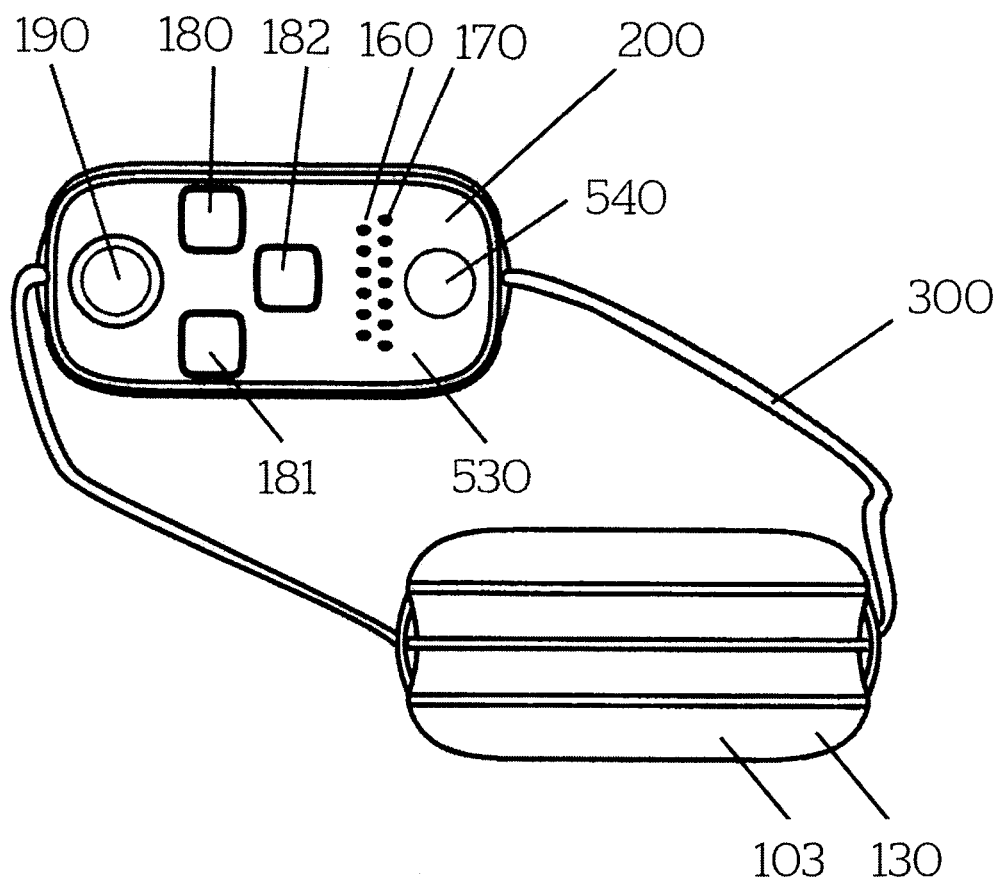
FIG. 11 is a top view illustrating the radio of FIG. 1 with its top lid opened and moved to one side in accordance with an embodiment of the invention.
Figure 12:
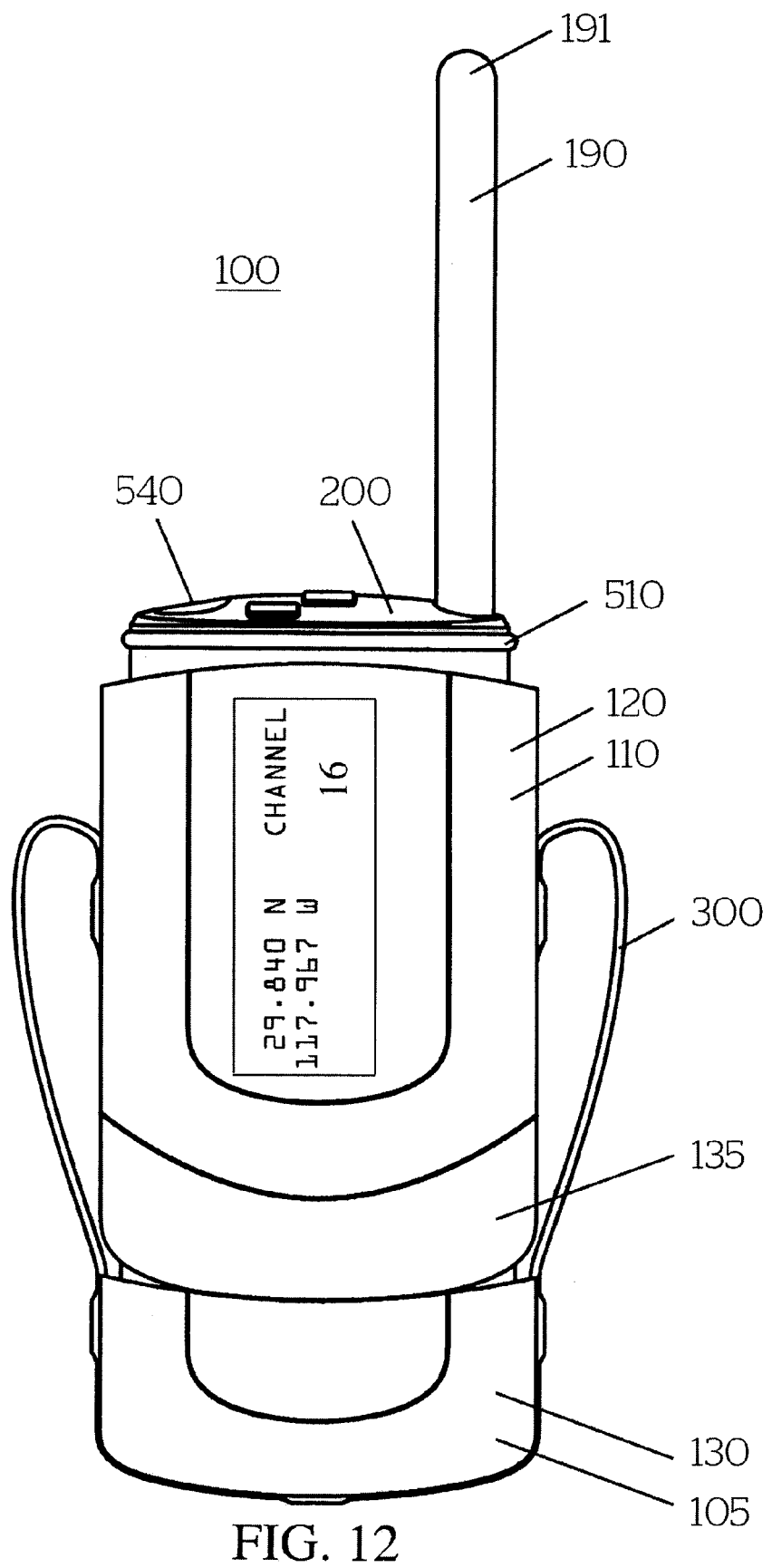
FIG. 12 is a front view illustrating the radio of FIG. 1 with its top lid installed on the base of the bottom lid in accordance with an embodiment of the invention.
Figure 13:
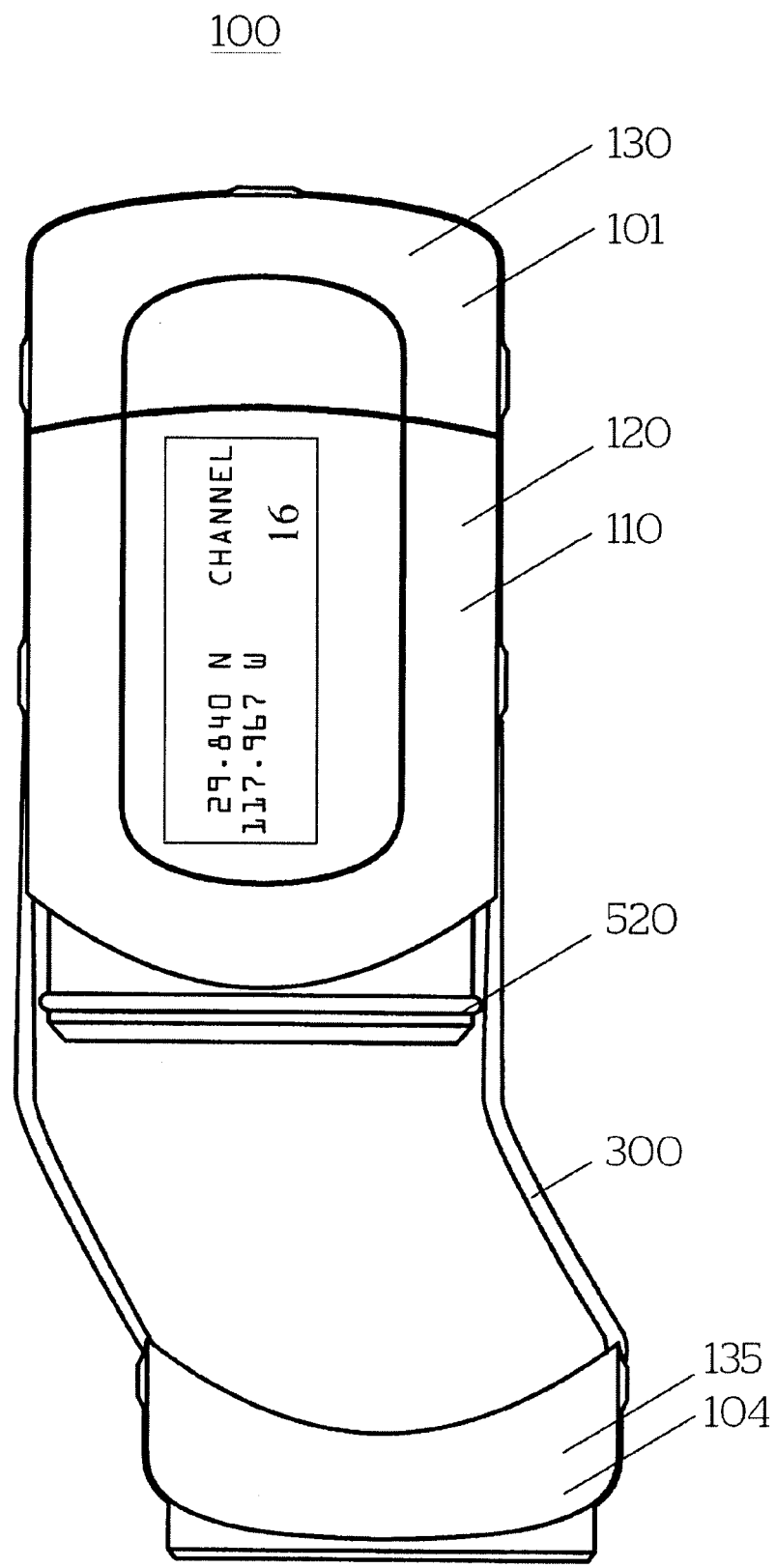
FIG. 13 is a front view illustrating the radio of FIG. 1 with its bottom lid opened and moved to one side in accordance with an embodiment of the invention.
Figure 14:
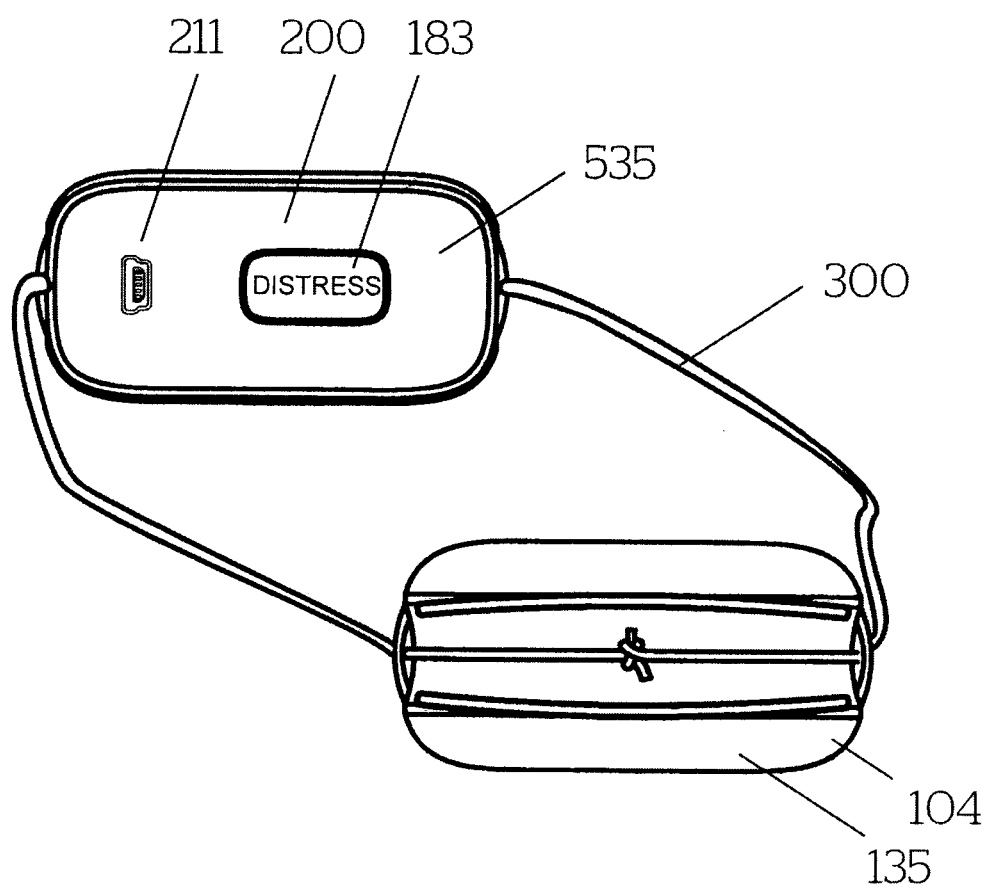
FIG. 14 is a bottom view illustrating the radio of FIG. 1 with its bottom lid opened and moved to one side in accordance with an embodiment of the invention.
Figure 15:
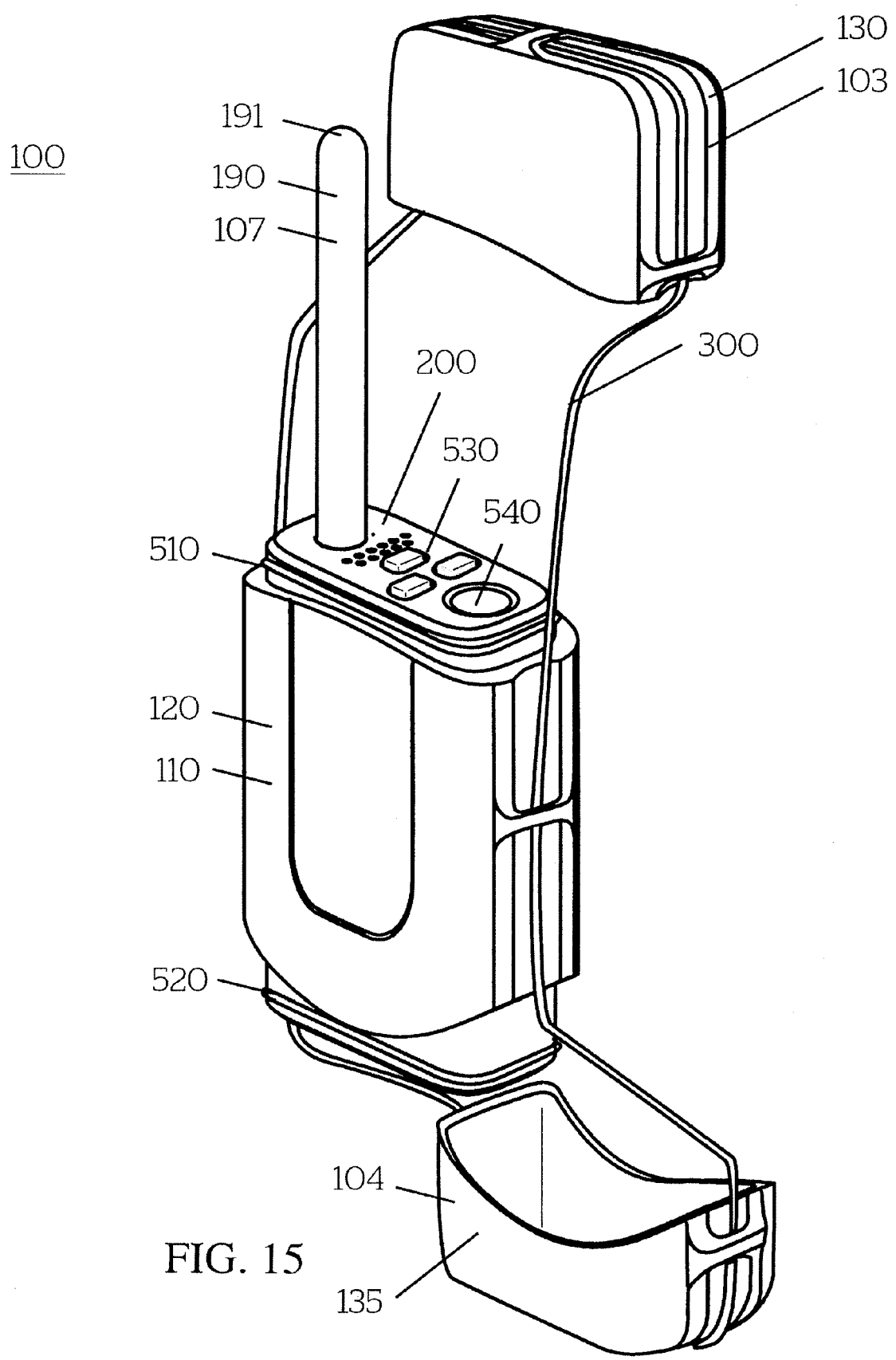
FIG. 15 is a rear perspective view illustrating the radio of FIG. 1 with its top and bottom lids opened and moved to one side in accordance with an embodiment of the invention.

FIG. 8 is a front view illustrating the radio 100 of FIG. 1 with its top lid 130 opened and with its antenna 190 folded in accordance with an embodiment of the invention. FIG. 9 is a right side view illustrating the radio 100 of FIG. 1 with its top lid 130 opened in accordance with an embodiment of the invention. FIG. 10 is a rear perspective view illustrating the radio 100 of FIG. 1 with its top lid 130 opened and moved to one side and with its antenna 190 extended in accordance with an embodiment of the invention. FIG. 11 is a top view illustrating the radio 100 of FIG. 1 with its top lid 130 opened and moved to one side in accordance with an embodiment of the invention. FIG. 12 is a front view illustrating the radio 100 of FIG. 1 with its top lid 130 installed on the base 136 of the bottom lid 135 in accordance with an embodiment of the invention. FIG. 13 is a front view illustrating the radio 100 of FIG. 1 with its bottom lid 135 opened and moved to one side in accordance with an embodiment of the invention. FIG. 14 is a bottom view illustrating the radio 100 of FIG. 1 with its bottom lid 135 opened and moved to one side in accordance with an embodiment of the invention. And, FIG. 15 is a rear perspective view illustrating the radio 100 of FIG. 1 with its top and bottom lids 130, 135 opened and moved to one side in accordance with an embodiment of the invention.

Figure 16:
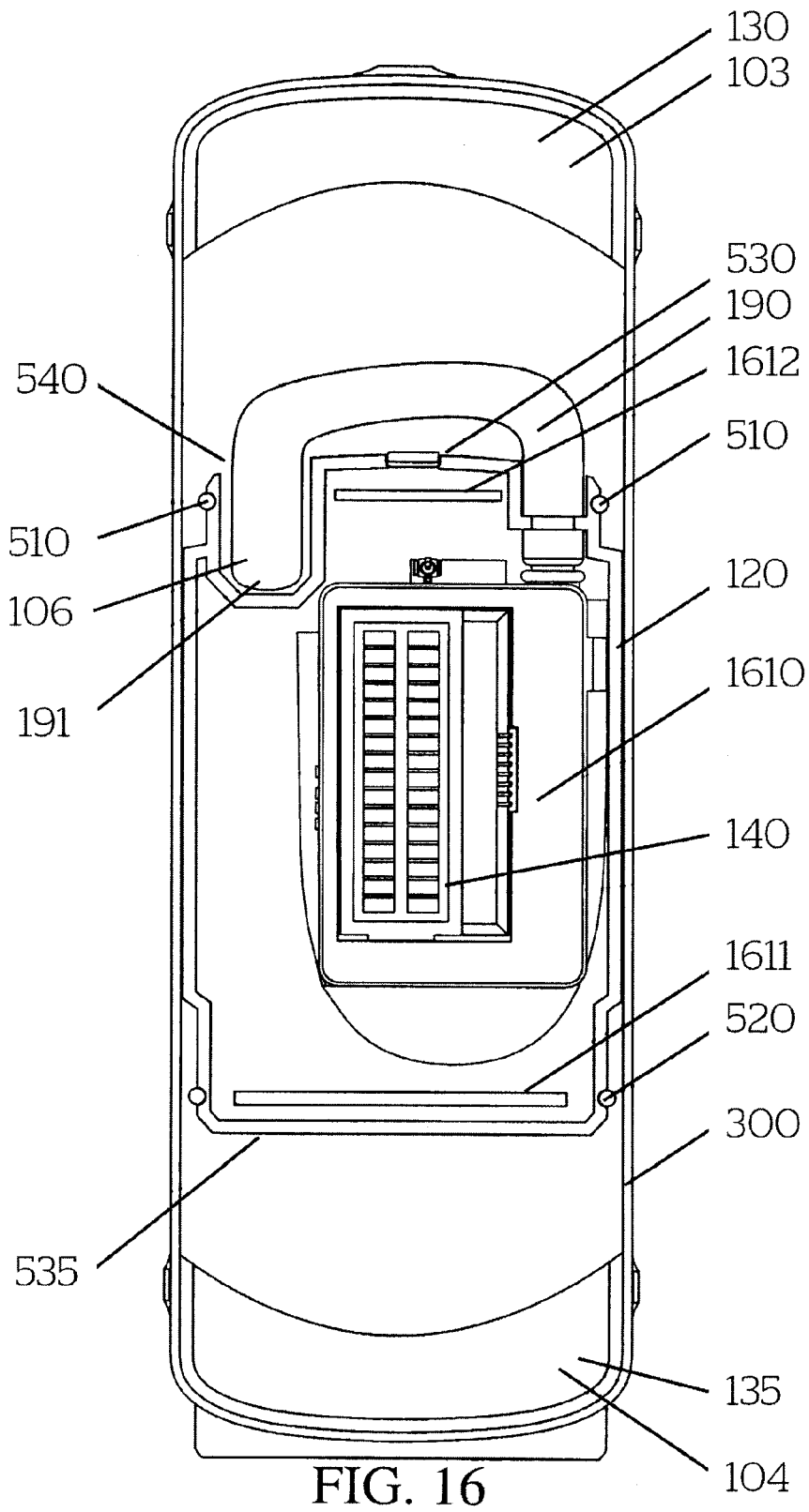
FIG. 16 is a front cross sectional view illustrating the radio of FIG. 1 with its top and bottom lids opened and with its antenna folded in accordance with an embodiment of the invention.
Figure 17:
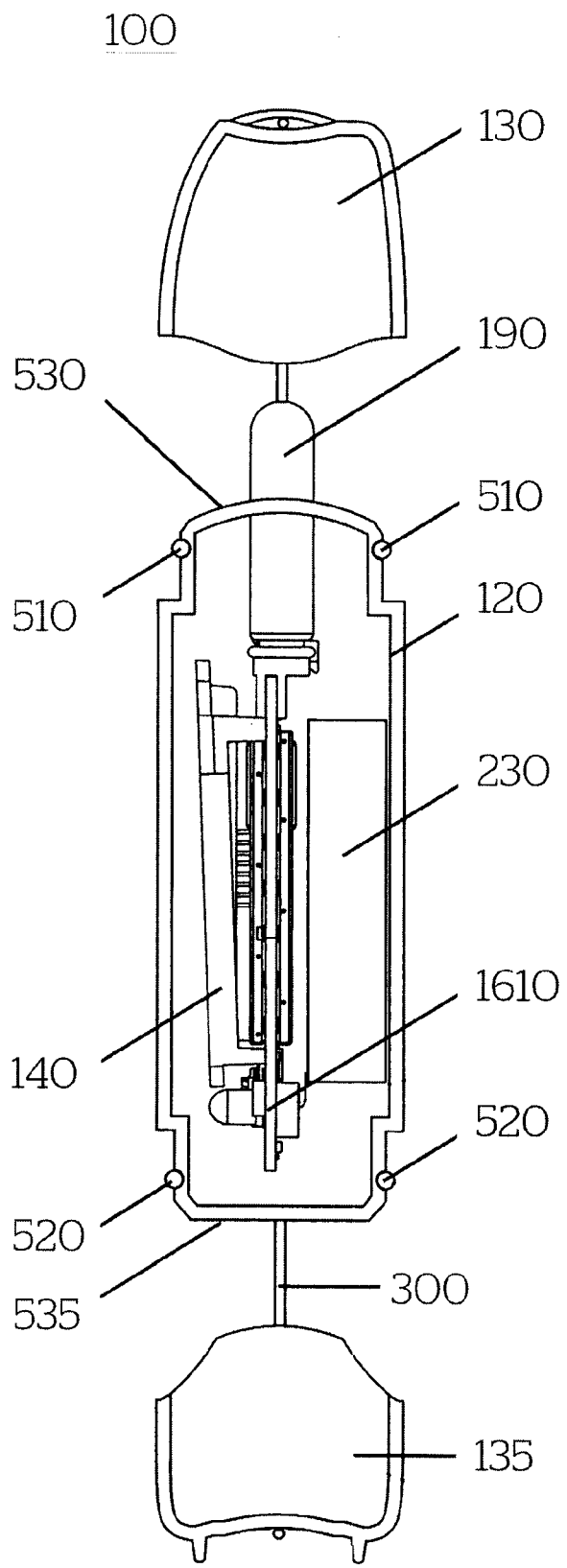
FIG. 17 is a right side cross sectional view illustrating the radio of FIG. 1 with its top and bottom lids opened in accordance with an embodiment of the invention.
Figure 18:
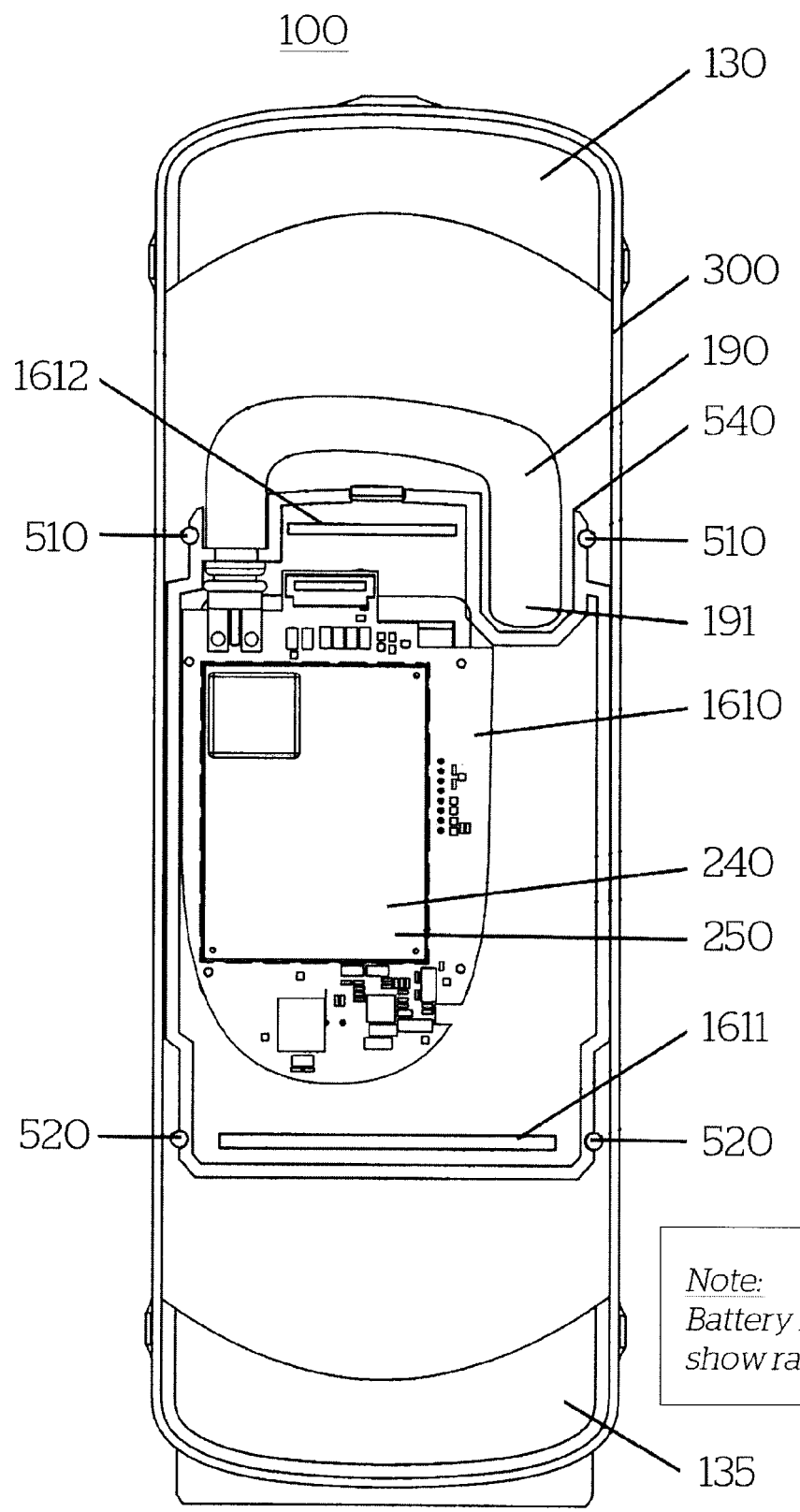
FIG. 18 is a rear cross sectional view illustrating the radio of FIG. 1 with its top and bottom lids opened in accordance with an embodiment of the invention; and, FIG. 19 is a block diagram illustrating the radio of FIG. 1 in accordance with an embodiment of the invention.
Figure 19:
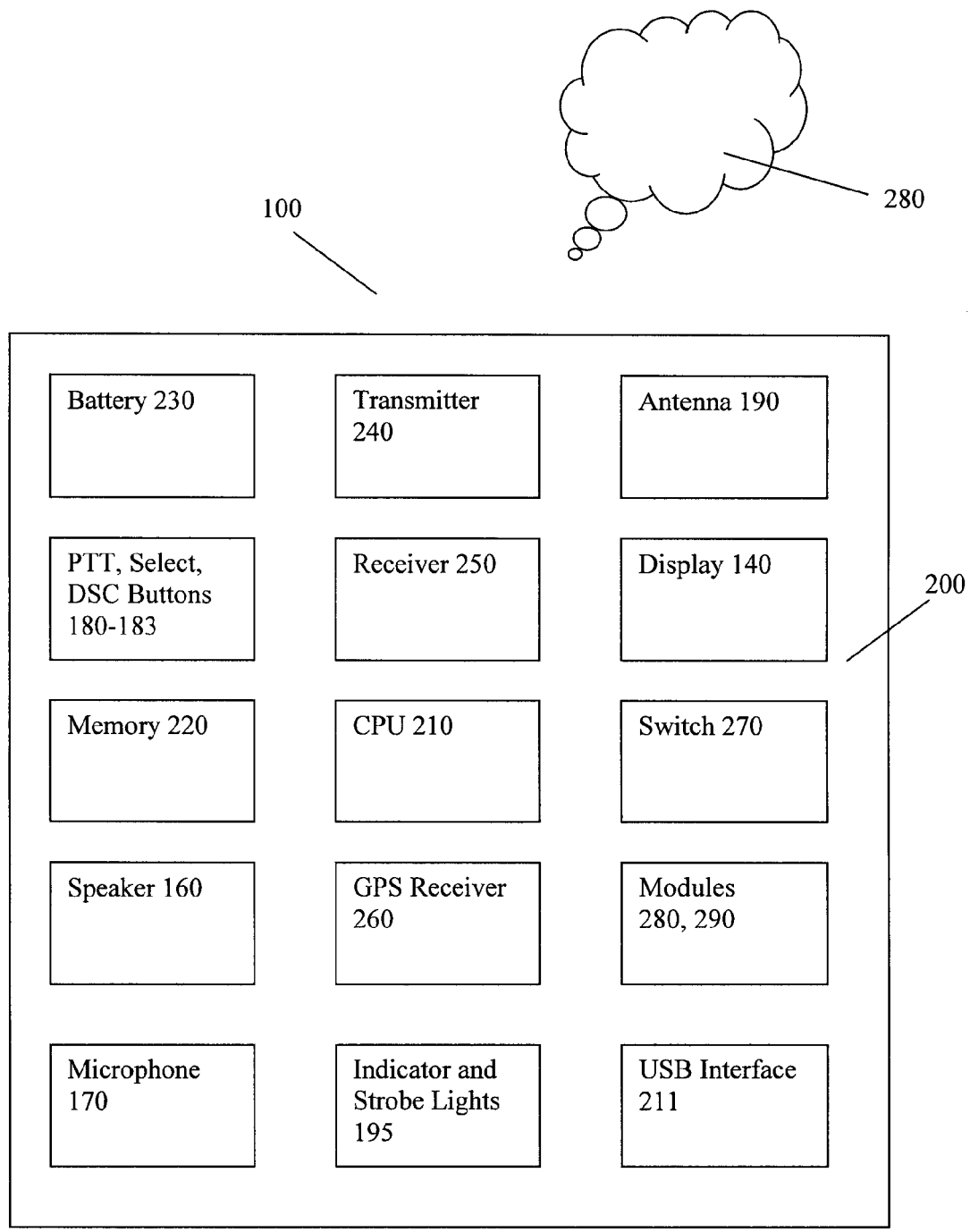

FIG. 16 is a front cross sectional view illustrating the radio 100 of FIG. 1 with its top and bottom lids 130, 135 opened and with its antenna 190 folded in accordance with an embodiment of the invention. FIG. 17 is a right side cross sectional view illustrating the radio 100 of FIG. 1 with its top and bottom lids 130, 135 opened in accordance with an embodiment of the invention. FIG. 18 is a rear cross sectional view illustrating the radio 100 of FIG. 1 with its top and bottom lids 130, 135 opened in accordance with an embodiment of the invention. And, FIG. 19 is a block diagram illustrating the radio 100 of FIG. 1 in accordance with an embodiment of the invention.

According to one embodiment, the radio 100 includes an enclosure 110 having a body 120 and top and bottom lids (or caps) 130, 135, a display (e.g., a liquid crystal display ("LCD")) 140, a graphical user interface ("GUI") 150 displayed on the display 140, and a radio system 200. The radio system 200 includes a speaker 160 (e.g., an electromechanical speaker), a microphone 170 (e.g., an electret microphone), a chat (non-emergency) push-to-talk button 180, a hailing (emergency) push-to-talk button 181, a select button 182, and a Digital Selective Calling ("DSC") distress button 183. Internally, the radio system 200 of the radio 100 may include one or more circuit boards 1610, 1611, 1612, a microprocessor (or central processing unit ("CPU")) 210 which controls overall operation of the radio 100, memory 220, a battery 230 (e.g., a Lithium ion battery), an antenna 190, a transmitter 240 (e.g., a VHF transmitter), a receiver 250 (e.g., a VHF receiver), an universal serial bus ("USB") interface 211 for transmitting and receiving information and settings to and from external devices and for charging the battery 230, and a Global Positioning System ("GPS") receiver 260 (e.g., an L1 Band GPS receiver) which are operatively coupled to the display 140, the speaker 160, the microphone 170, the push-to-talk, select, and distress ("DSC") buttons 180, 181, 182, 183, and an on/off switch 270, as will be described below.

The radio 100 may operate over a wireless network 280. The wireless network 280 may include antenna, base stations, access points, transceivers, supporting radio equipment, etc., as known to those of ordinary skill in the art, for supporting wireless communications between the radio 100 and other devices (not shown).

The radio 100 may be a two-way communication device having at least voice and data communication capabilities, including the capability to communicate with other devices. Depending on the functionality provided by the radio 100, it may be referred to as a radio, a rescue radio, a wireless device, a data messaging device, a cellular telephone with data messaging capabilities, a data communication device (with or without telephony capabilities), or a portable or handheld radio device. The radio 100 may communicate with any one of a plurality of transceiver stations (not shown) within its geographic coverage area.

The radio system 200 includes computer executable programmed instructions for directing the system 200 to implement the embodiments of the present invention. The programmed instructions may be embodied in one or more hardware modules 280 or software modules 290 resident in the memory 220 of the radio system 200 or elsewhere (e.g., 210).

The microprocessor 210 is coupled to the memory 220. The memory 220 has various hardware and software components for storing information (e.g., instructions, data, database tables, test parameters, etc.) for enabling operation of the radio 100. To provide a user-friendly environment to control the operation of the radio 100, operating system software modules 290 resident on the rescue radio 100 may provide a basic set of operations for supporting various applications which may be operable through the GUI 150 and supporting GUI software modules 290. The radio 100 may be provided with additional hardware 280 and/or software modules 290 for facilitating and implementing various functions.

According to one embodiment, the top and bottom lids 130, 135 are coupled to the body 120 by a strap or cord 300. According to one embodiment, a separate cord 300 may be used for each lid 130, 135. The lids 130, 135 may be secured to the body 120 in their closed positions 101, 102 by friction or snap fit. According to one embodiment, the cord 300 may be elasticized to secure the lids 130, 135 to the body 120.

According to one embodiment, the cord 300 is disposed in a bore, recess, or groove 350 formed in the sides of the body 120, in the top and the sides and top lid 130, and in the base 136 and sides of the bottom lid 135. Retainers 360 formed over the groove 350 in the body 120, top lid 130, and bottom lid 135 and under which the cord 300 passes may be provided to retain the cord 300 in the groove 350.

According to one embodiment, the base 136 of the bottom lid 135 has legs 137, 138 formed thereon for supporting the radio 100 in an upright position. The legs 137, 138 may be positioned on either side of the groove 350. The legs 137, 138 may be shaped to accept and retain 105 the top lid 130 by friction or snap fit as shown in FIG. 12.

According to one embodiment, access to the speaker 160, microphone 170, chat (non-emergency) push-to-talk button 180, hailing (emergency) push-to-talk button 181, select button 182, and antenna 190, all of which are located on the top cover 530 of the body 120, is made by opening or removing the top lid 130. Access to the distress button 183 and USB interface 211, both of which are located on the bottom cover 535 of the body 120, is made by opening or removing the bottom lid 135.

According to one embodiment, O-ring bore seals 510, 520 ensure that the enclosure 110 is waterproof when the lids 130, 135 are closed over the body 120. According to one embodiment, top and bottom covers or cover portions 530, 535 of the body 120 are provided for the radio system 200 which ensures that the radio system 200 is protected when the lids 130, 135 are in their opened positions 103, 104.

According to one embodiment, the microphone 170 is located adjacent to the speaker 160. The microphone 170 and speaker 160 may be protected from the elements by a rubber membrane which may be included in or form the top cover 530. The microphone 170 and speaker 160 may be waterproof devices.

According to one embodiment, the radio system 200 of the radio 100 may be mounted on one or more circuit boards 1610, 1620, 1630 which may be mounted within the body 120 of the enclosure 110. The body 120 may enclose the radio system 200, circuit boards 1610, 1620, 1630, battery 230, and antenna 190.

According to one embodiment, the radio 100 is made waterproof by the use of an injected moulded housing or enclosure 110 of adequate wall thickness combined with one or more O-ring bore seals 510, 520 under the lids 130, 135. According to one embodiment, additional O-ring bore seals may be used to increase waterproof depth ratings.

According to one embodiment, the power output of the radio 100 is approximately 1 Watt. According to another embodiment, the power output of the radio 100 is approximately 4 Watts. According to one embodiment, the radio 100 operates in simplex mode. According to another embodiment, the radio 100 operates in duplex mode.

According to one embodiment, the select button 182 is used to navigate and select items from a menu presented via the GUI 150 on the display screen 140.

According to one embodiment, the select button 182 also functions as an on/off switch 270. The radio 100 may be turned on by pressing the select button 182.

According to one embodiment, an on/off switch 270 coupled to one or more of the lids 130, 135 detects when the lid 130, 135 has been opened and activates the radio system 200. According to one embodiment, one or more of the lids 130, 135 act as the switch 270.

According to one embodiment, the top lid 130 may be closed after the radio 100 is turned on. Once the top lid 130 is closed, the volume of the speaker 160 may be increased automatically so that sound emitted by the speaker 160 may still be heard by a user.

According to one embodiment, upon activation of the radio system 200, the geographic position of the radio 100 obtained from the GPS receiver 260 is presented on the display 140 in degrees of longitude and latitude 150.

According to one embodiment, when the chat push-to-talk button 180 is pressed, the user may transmit voice communications on a first channel (e.g., a first VHF channel such as VHF Channel 68). Typically, this first channel would be used for non-emergency voice communications. An indicator light 195 may be associated with the operation of the chat push-to-talk button 180.

According to one embodiment, when the hailing push-to-talk button 181 is pressed, the user may transmit voice communications on a second channel (e.g., a second VHF channel such as VHF Channel 16). Typically, this second channel would be used for emergency voice communications. An indicator light 195 may be associated with the operation of the hailing push-to-talk button 181.

According to one embodiment, when the DSC distress button 183 is pressed, the radio 100 transmits a DSC distress signal including geographic position of the radio 100 obtained from the GPS receiver 260 on a third channel (e.g., a third VHF channel such as VHF Channel 70) to, for example, dive and rescue boats. Typically, this third channel would be used for emergency non-voice communications. A pulsing strobe light 195 may be associated with the operation of the DSC button 182.

According to one embodiment, the antenna 190 may fold under the top lid 130 and may be contained within the enclosure 110 when the top lid 130 is in the closed position 101. A tip 191 of the antenna 190 may fit into a recess 540 formed in the top cover 530 of the radio system 200 to hold the antenna 190 in a folded position 106. The antenna 190 may be extendible (e.g., using springs) to its upright operating position 107 when the top lid 130 is in the opened position 103.

According to one embodiment, the antenna 190 is made of steel helicoil spring coated in rubber. The antenna 190 springs out automatically when the top lid 130 is opened due to the springiness of the coiled steel antenna which acts like a spring and unfurls when the top lid 130 is opened. Accordingly to another embodiment, the radio 100 includes a helper spring to unfurl the antenna 190 when the top lid 130 is opened.

According to one embodiment, the antenna 190 may fold under the top lid 130 and may be contained within the enclosure 110 when the top lid 130 is in the closed position 101. A tip 191 of the antenna 190 may fold or bend under the top lid 130 when the top lid 130 is in the closed position 101. The antenna 190 may be extendible (e.g., using springs) to its upright operating position when the top lid 130 is in the opened position 103.

According to one embodiment, the antenna 190 may retract into the body 120 through an opening formed in the cover 530 of the radio system 200 and hence may be contained within the enclosure 110 when the top lid 130 is in the closed position 101. The antenna 190 may be extendible (e.g., using springs) to its upright operating position when the top lid 130 is in the opened position 103.

According to one embodiment, the antenna 190 may be a flat, flexible antenna which may be contained in the body 120 of the radio 100 under the top cover 530 of the radio system 200.

According to one embodiment, the enclosure 110 of the radio 100 may have a transparent (or translucent) body 120 and transparent (or translucent) lids 130, 135. According to one embodiment, the display 140 is mounted on a circuit board 1610 within the body 120 such that it may be viewed through the transparent body 120 or a portion 121 thereof. According to one embodiment, the display 140 is mounted in the body 120 of the radio 100 and is made waterproof using a rubber membrane sealed into the outer surface of the body 120.

According to one embodiment, the radio 100 does not include a display 140 or a GUI 150. According to one embodiment, the enclosure 110 of the rescue radio 100 may have an opaque body 120 and opaque lids 130, 135. According to one embodiment, the enclosure 110 of the radio 100 may have an opaque body 120 and one or more transparent (or translucent) lids 130, 135.

Thus, according to one embodiment, there is provided a radio 100, comprising: an enclosure 110 having a top lid 130, a bottom lid 135, and a body 120, the top lid 130 and the bottom lid 135 being removable 103, 104 from the body 120; a radio system 200 mounted in the body 120, the body 120 having a top cover 530 and a bottom cover 535 for the radio system 200; a first seal 510 formed or provided between the top lid 130 and the body 120 to waterproof the radio system 200 when the top lid 130 is installed 101 over the top cover 530; a second seal 520 formed or provided between the bottom lid 135 and the body 120 to waterproof the radio system 200 when the bottom lid 135 is installed 102 over the bottom cover 535; and, at least one cord 300 for coupling the top lid 130 and the bottom lid 135 to the body 120.

In the above radio 100, the cord 300 may retain the top lid 130 and the bottom lid 135 over the top cover 530 and bottom cover 530, respectively. The radio may further include legs 137, 138 formed on a base 136 of the bottom lid 135 for supporting the radio 100 in an upright position. The legs 137, 138 may be shaped to accept and retain 105 the top lid 130 thereon when the top lid 130 is removed from over the top cover 530. The radio 100 may further include a first push-to-talk button 180 for communicating on a first channel, a second push-to-talk button 181 for communicating on a second channel, a microphone 170, and a speaker 160 mounted on the top cover 530 and protected by the top lid 130 when installed 101 over the top cover 530. The radio may further include a distress button 183 for sending a distress signal on a third channel mounted on the bottom cover 535 and protected by the bottom lid 135 when installed 102 over the bottom cover 535. The radio may further include an antenna 190 for the radio system 200 that is extendable to an upright position 107 when the top lid 130 is removed 103. A tip 191 of the antenna 190 may fit into a recess 540 formed in the top cover 530 to hold the antenna 190 in a folded position 106 under the top lid 130 when the top lid 130 is installed 101 over the top cover 130. At least a portion 121 of the body 120 may be transparent. The radio may further include a display 140 mounted in the body 120 and visible through the portion 121 of the body 120 for displaying a function, status, or location of the radio system 200. The radio 100 may further include a display 140 mounted on or in an exterior surface of the body 120 for displaying a function, status, or location of the radio system 200. The first seal 510 and the second seal 520 may be O-rings. The radio 100 may further include a switch 270 for activating the radio system 200. The switch 270 may be a button 182 mounted on the top cover 530. And, the radio system 200 may be a VHF radio system.

The above embodiments may contribute to an improved radio 100 and may provide one or more advantages. First, the cord 300 keeps the top and bottom lids 130, 135 from getting lost. Second, the positioning of the distress button 183 on the bottom cover 535 of the body 120 prevents it from being accidently pressed by a user. Third, installation of the top lid 130 on the legs 137, 138 of the bottom lid 135 keeps the lop lid 130 out of the way when the radio 100 is in use. Fourth, the radio 100 is truly waterproof. Fifth, the radio 100 is waterproofed for continuous submersion and is encapsulated in a tough, robust, waterproof shell. Six, the radio 100 is small, compact, robust, and is easily carried in the pocket of a life jacket, work vest, or regular jacket of a person in need of a portable radio. Such a person can activate the radio 100 very easily, report his or her GPS position if required, or activate the distress locator function if the situation worsens.

The embodiments of the invention described above are intended to be exemplary only. Those skilled in this art will understand that various modifications of detail may be made to these embodiments, all of which come within the scope of the invention.

What is claimed is:

1. A radio, comprising:
an enclosure having a top lid, a bottom lid, and a body, the top lid and the bottom lid being removable from the body;
a radio system mounted in the body, the body having a top cover and a bottom cover for the radio system;
a first seal formed or provided between the top lid and the body to waterproof the radio system when the top lid is installed over the top cover;
a second seal formed or provided between the bottom lid and the body to waterproof the radio system when the bottom lid is installed over the bottom cover; and,
at least one cord for coupling the top lid and the bottom lid to the body.

2. The radio of claim 1 wherein the cord retains the top lid and the bottom lid over the top cover and bottom cover, respectively.

3. The radio of claim 1 and further comprising legs formed on a base of the bottom lid for supporting the radio in an upright position.

4. The radio of claim 3 wherein the legs are shaped to accept and retain the top lid thereon when the top lid is removed from over the top cover.

5. The radio of claim 1 and further comprising a first push-to-talk button for communicating on a first channel, a second push-to-talk button for communicating on a second channel, a microphone, and a speaker mounted on the top cover and protected by the top lid when installed over the top cover.

6. The radio of claim 5 and further comprising a distress button for sending a distress signal on a third channel mounted on the bottom cover and protected by the bottom lid when installed over the bottom cover.

7. The radio of claim 1 and further comprising an antenna for the radio system that is extendable to an upright position when the top lid is removed.

8. The radio of claim 7 wherein a tip of the antenna is fit into a recess formed in the top cover to hold the antenna in a folded position under the top lid when the top lid is installed over the top cover.

9. The radio of claim 1 wherein at least a portion of the body is transparent.

10. The radio of claim 9 and further comprising a display mounted in the body and visible through the portion of the body for displaying a function, status, or location of the radio system.

11. The rescue radio of claim 1 and further comprising a display mounted on or in an exterior surface of the body for displaying a function, status, or location of the radio system.

12. The radio of claim 1 wherein the first seal and the second seal are O-rings.

13. The radio of claim 1 and further comprising a switch for activating the radio system.

14. The radio of claim 10 wherein the switch is a button mounted on the top cover.

15. The radio of claim 1 wherein the radio system is a VHF radio system.

* * * * *